(12) United States Patent
Kachmar (10) Patent No.: US 7,530,746 B2
(45) Date of Patent: May 12, 2009

(54) FIELD TERMINATION CONNECTOR WITH SHAPED ADHESIVE PRE-FORM

(75) Inventor: Wayne M. Kachmar, North Bennington, VT (US)

(73) Assignee: ABC Telecommunications, Inc., Eden Prairie, MN (US)

(*) Notice: Subject to any disclaimer, the term of this patent is extended or adjusted under 35 U.S.C. 154(b) by 29 days.

(21) Appl. No.: 11/735,260

(22) Filed: Apr. 13, 2007

(65) Prior Publication Data

US 2008/0253718 A1    Oct. 16, 2008

(51) Int. Cl.
G02B 6/36    (2006.01)

(52) U.S. Cl. .............................. 385/76; 385/78; 385/83; 385/92; 385/139

(58) Field of Classification Search .................. None
See application file for complete search history.

(56) References Cited

U.S. PATENT DOCUMENTS

| | | | |
|---|---|---|---|
| 4,588,256 A | 5/1986 | Onstott et al. | |
| 4,746,194 A | 5/1988 | Rasmussen | |
| 4,787,699 A | 11/1988 | Moulin | |
| 4,984,865 A | 1/1991 | Lee et al. | |
| RE34,005 E | 7/1992 | Levinson et al. | |
| 5,418,876 A | 5/1995 | Lee | |
| 5,446,819 A | 8/1995 | Foster et al. | |
| 5,469,521 A | 11/1995 | Coutts et al. | |
| 5,611,017 A | 3/1997 | Lee et al. | |
| 5,631,986 A | 5/1997 | Frey et al. | |
| 6,054,007 A | 4/2000 | Boyd et al. | |
| 6,179,658 B1 | 1/2001 | Gunay et al. | |
| 6,325,670 B2 | 12/2001 | Murayama | |
| 6,432,511 B1 | 8/2002 | Davis et al. | |
| 6,782,182 B2 | 8/2004 | Dautartas et al. | |
| 6,811,323 B2 | 11/2004 | Murray et al. | |
| 6,819,858 B2 | 11/2004 | Steinberg et al. | |
| 6,848,837 B2 | 2/2005 | Gilligan | |
| 6,893,591 B2 | 5/2005 | Davis et al. | |

(Continued)

FOREIGN PATENT DOCUMENTS

EP    0 479 415 A2    4/1992

(Continued)

OTHER PUBLICATIONS

International Search Report and Written Opinion mailed Aug. 11, 2008.

*Primary Examiner*—Michelle R Connelly Cushwa
(74) *Attorney, Agent, or Firm*—Merchant & Gould, P.C.

(57) ABSTRACT

An optical fiber terminating assembly includes a housing, which can receive an optical fiber to be terminated so that it is located in alignment with a length of another optical fiber, or an optoelectronic device, a heat responsive adhesive element, and a thermally conductive element. The housing includes a compartment through which the optical fiber to be terminated can extend. The heat responsive adhesive element is disposed in the compartment and includes at least one pathway pre-formed dispose in the heat responsive adhesive element. A portion of the optical fiber is disposed in the pathway. The thermally conductive element is disposed in the compartment and is coupleable to a source of energy so that heat in the thermally conductive element causes the heat responsive adhesive element to soften and adhere to the optical fiber in the channel to secure it in position.

20 Claims, 5 Drawing Sheets

U.S. PATENT DOCUMENTS

| | | |
|---|---|---|
| 6,945,706 B2 | 9/2005 | Gimbel et al. |
| 7,147,384 B2 | 12/2006 | Hardcastle et al. |
| 2002/0067894 A1 | 6/2002 | Scanzillo |
| 2003/0133671 A1* | 7/2003 | Murray et al. ............... 385/80 |
| 2005/0265669 A1* | 12/2005 | Heminway et al. ........... 385/91 |
| 2005/0281518 A1 | 12/2005 | Tanaka et al. |

FOREIGN PATENT DOCUMENTS

| | | |
|---|---|---|
| EP | 0 689 070 A1 | 12/1995 |
| EP | 0 810 455 A1 | 12/1997 |
| GB | 2 193 342 A | 2/1988 |
| JP | 61-284710 | 12/1986 |
| JP | 4-40402 | 2/1992 |
| WO | WO 01/96923 A1 | 12/2001 |

* cited by examiner

FIG. 4

FIELD TERMINATION CONNECTOR WITH SHAPED ADHESIVE PRE-FORM

TECHNICAL FIELD

The present invention relates to field termination connectors for use in terminating an optical fiber or optical fibers, and more particularly, to the adhesive used with such connectors.

BACKGROUND

The adhesive typically used in optical fiber terminations requires a sufficient duration of heat to be applied to the adhesive so that the adhesive completely melts and flows around the optical fibers in an optical fiber connector. An example field terminatable connector is disclosed in U.S. Pat. No. 6,811,323, that is hereby incorporated by reference. Configurations/systems that facilitate effective melting of adhesive are desirable.

SUMMARY

An aspect of the disclosure relates to an optical fiber terminating assembly having a housing, which can receive an optical fiber to be terminated so that it is located in alignment with a length of another optical fiber, or an optoelectronic device, a heat responsive adhesive element, and a thermally conductive element. The housing includes a compartment through which the optical fiber to be terminated can extend. The heat responsive adhesive element is disposed in the compartment and includes a surface with at least one preformed pathway. A portion of the optical fiber is disposed in the pathway. The thermally conductive element is disposed in the compartment and is coupleable to a source of energy so that heat in the thermally conductive element causes the heat responsive adhesive element to soften and adhere to the optical fiber in the pathway to secure it in position.

Another aspect of the disclosure relates to an optical fiber terminating assembly having an outer body member, a first member, and a housing. The first member is locatable within the outer body member and carries a length of optical fiber that protrudes from the first member. The housing is locatably in alignment with the first member and has an access opening for receiving an optical fiber to be terminated so that the optical fiber can be aligned and abutted with the length of optical fiber. A compartment, through which the optical fiber to be terminated extends, is defined by the housing. The compartment receives a heat responsive adhesive element, which defines at least one pathway, and a thermally conductive element, which can be coupled to a source of energy so that heat in the thermally conductive element causes the heat responsive adhesive element to soften and adhere to the optical fiber to secure it in position.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the present invention and many of the attendant advantages of the present invention will be readily appreciated as the present invention becomes better understood by reference to the following Detailed Description when considered in connection with the accompanying drawings, and wherein.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Referring now to FIGS. 1 through 5, a plug assembly, generally designated 2, for use in terminating at least one optical fiber is shown. The plug assembly 2 includes an outer body member, generally designated 10, a first member part, generally designated 11, and a housing part, generally designated 12.

Figures 1, 2:
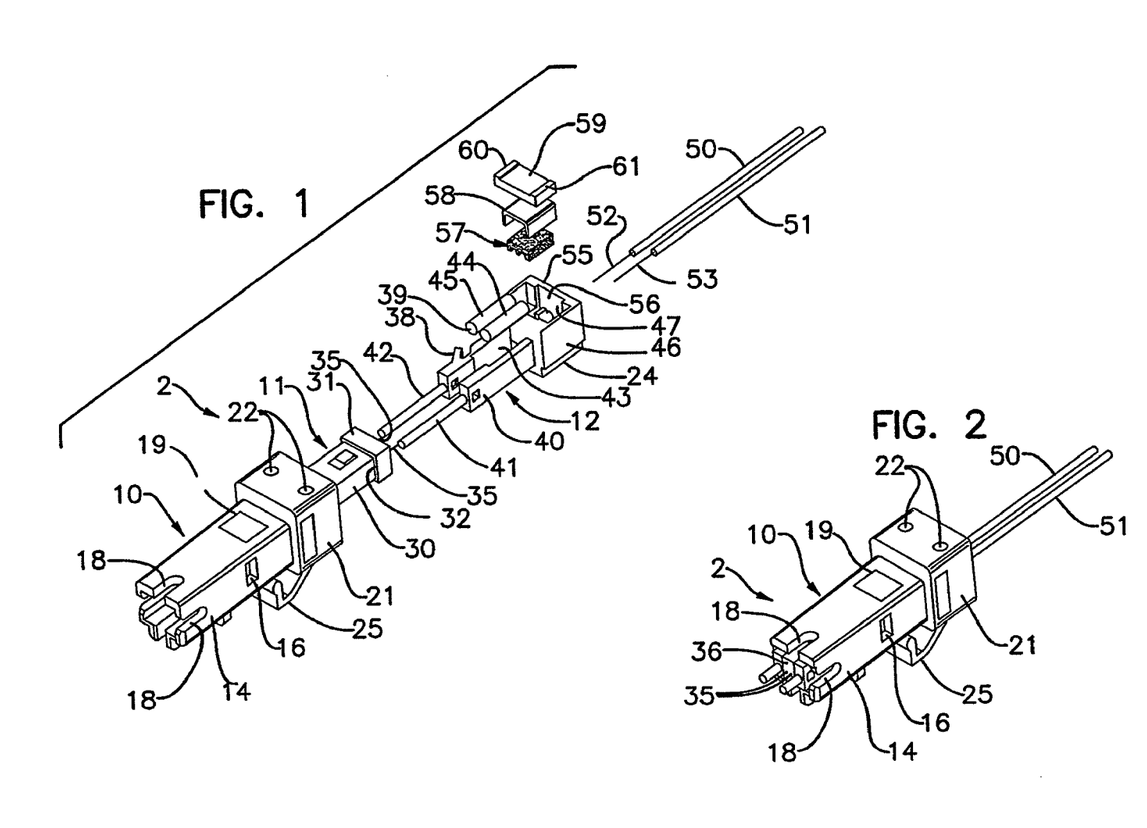
FIG. 1 is an exploded view of a plug assembly made in accordance with the present invention.
FIG. 2 is a perspective view of a plug assembly made in accordance with the present invention.
Figure 3:
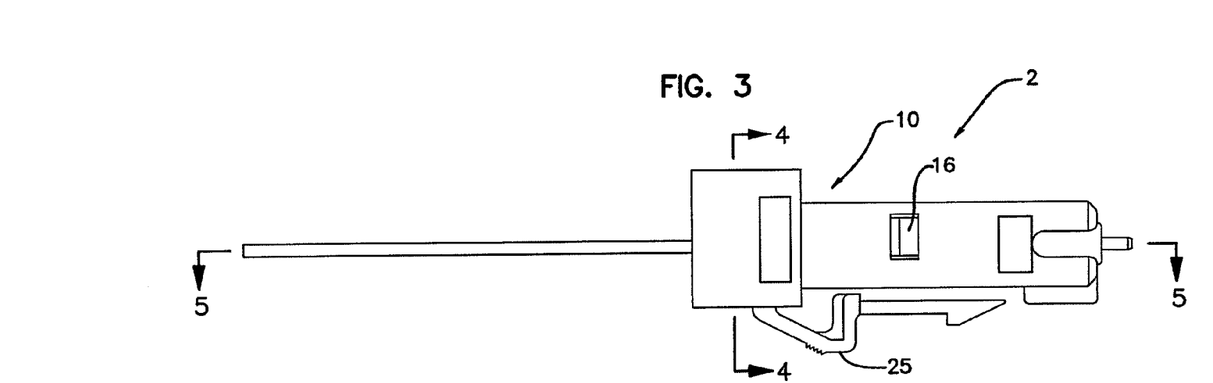
FIG. 3 is a side elevation of a plug assembly made in accordance with the present invention.

The outer body member 10 has a body portion 14 that defines therein a space of generally rectangular cross-section, which can receive the first member 11. Two opposite side walls of the body portion 14 each have an aperture 16 formed therein at a generally central location. The open end of the body portion 14 has four longitudinally extending slots identified by reference number 18, the slots 18 being arranged so that one slot 18 is formed in each of the walls of the body portion 14.

Figure 5:
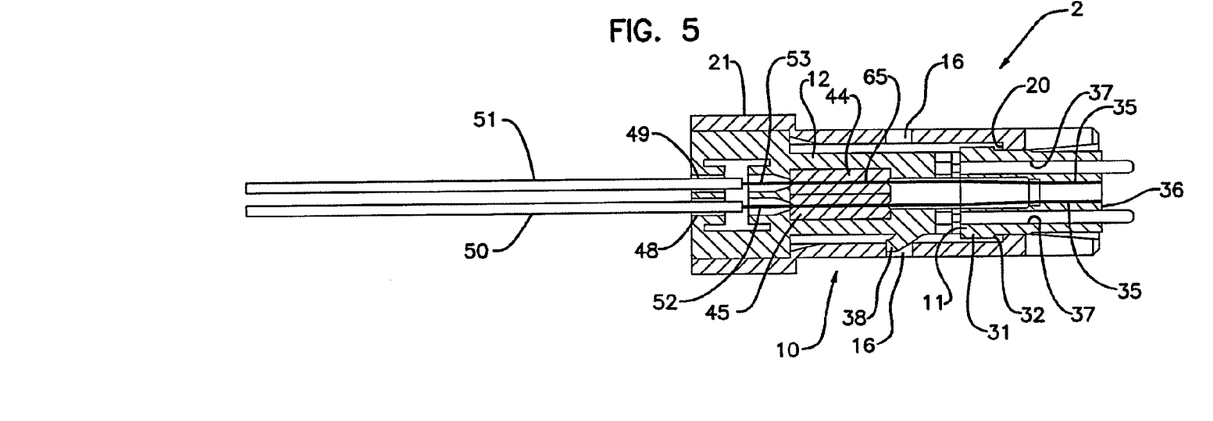
FIG. 5 is a cross-sectional view taken on line 5-5 of FIG. 3 of a plug assembly which is made in accordance with the present invention.

The internal surface of the body portion 14 is formed with a step 20, which is illustrated in FIG. 5 of the drawings. The top wall of the body portion 14 can have a transparent section 19.

Figure 4:
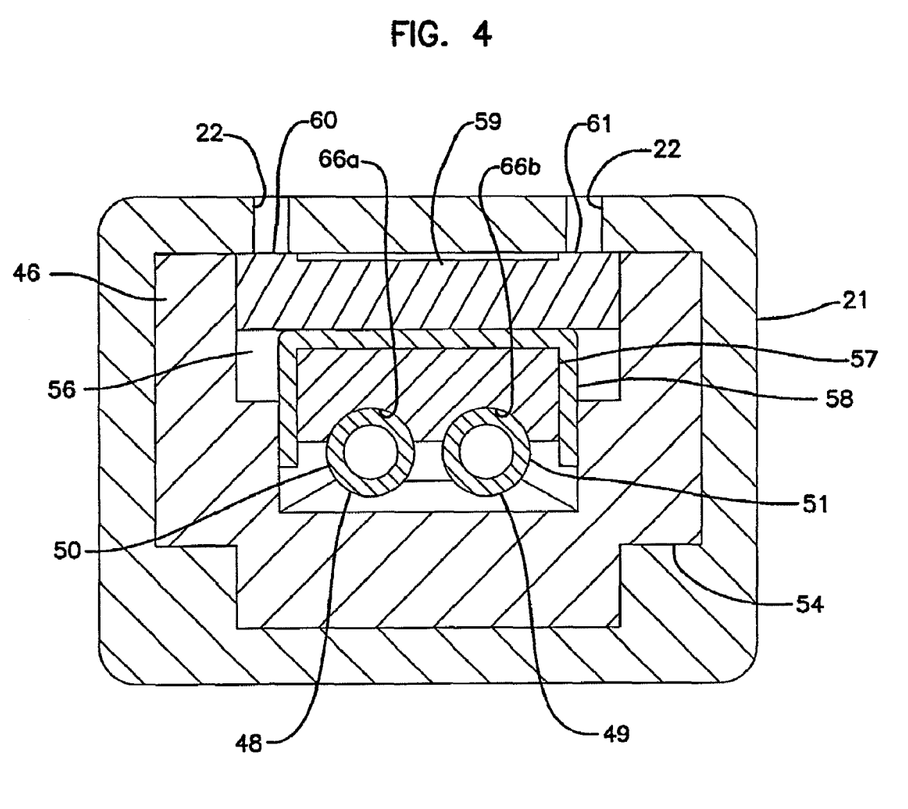
FIG. 4 is a cross-sectional view taken on line 4-4 of FIG. 3 of a plug assembly which is made in accordance with the present invention.

The other end of the outer body member 10 has an enlarged portion 21 which is formed integrally with the body portion 14. In the top wall of the enlarged portion 21 are formed two spaced through holes 22. Internally, as shown in FIG. 4, opposite side walls of the body portion 14 have steps 54. The lower wall of the portion 21 has an integrally formed resilient catch element 25 which can be used to secure the plug assembly in another part of an optical fiber connector in a manner which will be apparent to those skilled in the art.

The first member 11 comprises a main body portion 30 of generally rectangular cross-section and an end portion 31 whose dimensions are slightly greater than the body portion 30 so that a step 32 is formed around their junction. The first member 11 has secured therein a pair of optical fiber lengths 35 which at one end are substantially flush with an end face 36 of the first member and at the other end protrude from the end portion 31 as illustrated in FIG. 1. Also, the first member 11 has two longitudinally extending bores 37 formed therein, which extend for the full length of the main body portion 30. The housing part 12 has a first generally channel-shaped section 40 from one end of which projects a pair of spaced pins 41, 42. The channel-shaped section 40 defines a cavity 43 which can receive a pair of optical fiber alignment elements in the form of a pair of guide sleeves 44, 45 which preferably are optically transparent. Each guide sleeve 44, 45 has a through bore 39 with a diameter corresponding to that of an optical fiber. The ends of each through bore 39 are widened to facilitate insertion of an optical fiber. One side wall of the channel-shaped section 40 has an outwardly extending projection 38.

The housing part 12 also includes an end housing part 46 which is formed integrally with the channel-shaped section 40. The end housing part 46 defines a compartment 47. The lower surface of the compartment 47 defines two side-by-side grooves 48, 49 in which can be located the protective outer sleeves 50, 51 of two optical fibers 52, 53, which are to be terminated. The outer surface of opposite side walls of the end housing part 46 each have a step 24. The end wall 55 of the end housing part 46 has formed therein an aperture 56. The compartment 47 can accommodate above the optical fibers 52, 53 and outer sleeves 50, 51 a heat responsive adhesive in the form of a glue pellet, generally designated 57, that is straddled by a thermally conductive saddle 58 on top of which is located an electrical resistor 59 having conductive pads 60, 61. The saddle may be formed from aluminum, ceramic, or other suitable thermally conductive material.

In order to assemble the plug assembly 2, the pins 41, 42 on the housing part 12 are located within the longitudinally extending bores 37 formed in the first member 11, the housing part 12 is moved towards the first member 11 and the protruding parts of the optical fibers 35 locate into one end of the guide sleeves 44, 45, which sit within the cavity 43 of the housing part 12.

The assembly of the glue pellet 57, the saddle 58, and the resistor 59 are located in the compartment 47 as shown in FIG. 4 of the drawings. The first member 11 and housing part 12 are moved into the outer body member 10 so that they assume the position shown in FIG. 5 of the drawings. It will be noted that this movement is arrested when the step 32 on the first member 11 comes into contact with the step 20 formed on the interior surface of the outer body member 10. Also at this point the projection 38 on the channel-shaped section 40 locates within the opening 16 to secure the body parts in position. The step 24 on the outer surface of the end housing part 46 sits on the step 54 on the interior of the body portion 21.

In use the optical fibers to be terminated are fed through the aperture 56 in the end wall 55 into the compartment 47 so that the outer sleeves 50, 51 of the optical fibers 52, 53 sit within the grooves 48, 49 at the base of that compartment. The optical fibers 52, 53 which protrude from the outer sleeves 50, 51 are fed into the end of the guide sleeves 44, 45 until they meet and abut with the optical fiber lengths 35 at a position 65 shown in FIG. 5.

Optical radiation is then passed through the optical fibers 52, 53 and the junction of the fibers 52, 53 with the optical fiber lengths 35 is detected through the transparent section 19 of the body member 10. If radiation is detectable, this is an indication that the fibers 52, 53 and optical fiber lengths 35 are not aligned and/or abutted correctly. They are then manipulated until the radiation is substantially extinguished indicating correct abutment and/or alignment. At this point an electrical power source (not shown) is connected to the pads 60, 61 of the resistor by passing electrical conductive terminals of the power source through the apertures 22 formed in the portion 20 of the outer body member 10 so that they contact the pads 60, 61. Electrical current is passed through the resistor 59 which heats up the glue pellet 57 by way of the thermally conducting saddle 58. As the glue pellet 57 heats up, the glue pellet 57 becomes tacky and adheres to the outer sleeves 50, 51 and the optical fibers 52, 53 and closes openings to the guide sleeves 44, 45. The thermally conducting saddle 58 has a good thermal conductive bond with the resistor 59. When the current is interrupted the adhesive then resets to secure the outer sleeves 50, 51 and the optical fibers 52, 53 in their correct position in alignment and abutment with the optical fiber lengths 35.

Figure 6:
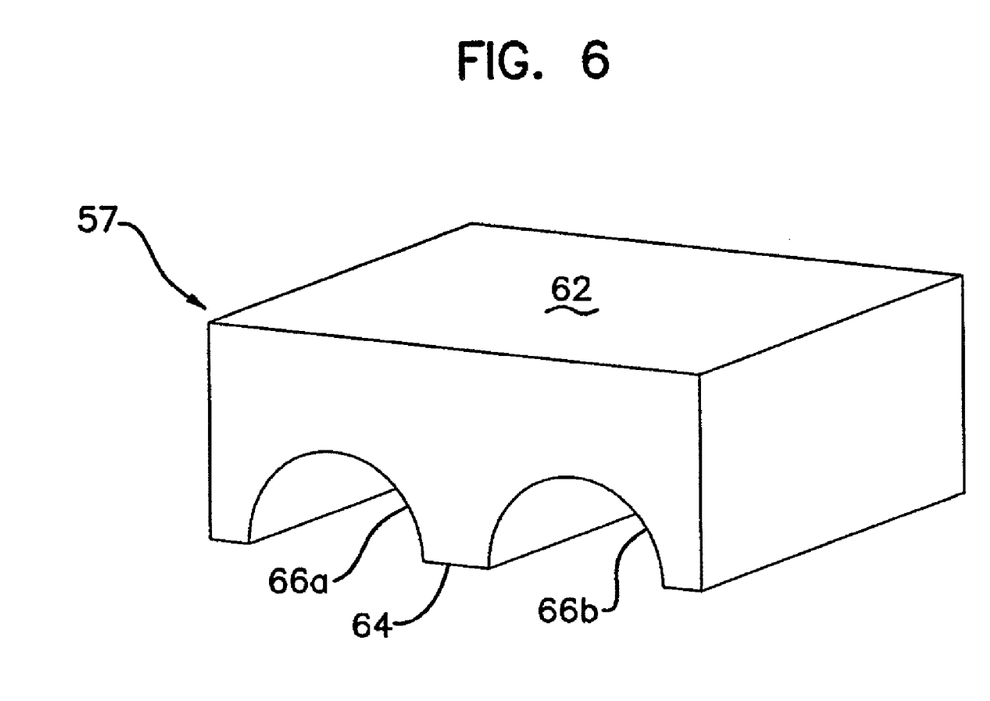
FIG. 6 is a perspective view of a glue pellet made in accordance with the present invention.

Referring now to FIG. 6, the glue pellet 57 will be further described. The glue pellet 57 is shown as being generally rectangular in shape, although it will be understood by those skilled in the art after reviewing the present disclosure that the scope of the present invention is not limited to the glue pellet 57 being rectangular in shape. The glue pellet 57 includes a first surface 62 and a second surface 64. In the preferred embodiment, the second surface 64 is oppositely disposed from the first surface 62. At least one pathway 66 is preformed in the glue pellet 57. In the subject embodiment, the at least one pathway 66 is at least one channel 66 that is pre-formed in the second surface 64 of the glue pellet 57. In the preferred embodiment, two channels 66a, 66b are preformed in the second surface 64. The channels 66a, 66b are adapted to receive a portion of the outer sleeves 50, 51, respectively, and a portion of the optical fibers 52, 53, respectively. In the subject embodiment, each of the channels 66a, 66b are arcuately shaped so as to conform to the outer surface of the outer sleeves 50, 51.

Referring again to FIG. 4, as previously described, the glue pellet 57 is in thermally conductive contact with the saddle 58, which is in thermally conductive contact with the resistor 59. In the subject embodiment, the first surface 62 of the glue pellet 57 is in contact with a bottom surface 68 of the saddle 58, thereby establishing the thermally conductive contact between the glue pellet 57 and the saddle 58. The resistor 59 is in contact with a top surface 70 of the saddle 58, thereby establishing the thermally conductive contact between the resistor 59 and the saddle 58. While the first surface 62 of the glue pellet 57 and the resistor 59 are in contact with the bottom and top surfaces 68, 70, respectively, of the saddle 58, it will be understood by those skilled in the art that the scope of the present invention is not limited to such a configuration. A portion of the outer surface of each outer sleeve 50, 51 is disposed in channels 66a, 66b, respectively, of the glue pellet 57. In the subject embodiment, nearly half of the outer circumference of the outer surface of the outer sleeves 50, 51 is disposed in the channels 66a, 66b, respectively, although it will be understood by those skilled in the art that the scope of the present invention is not limited to nearly half of the outer circumference of the outer surface of the outer sleeves 50, 51 being disposed in the channels 66a, 66b.

Figure 7:
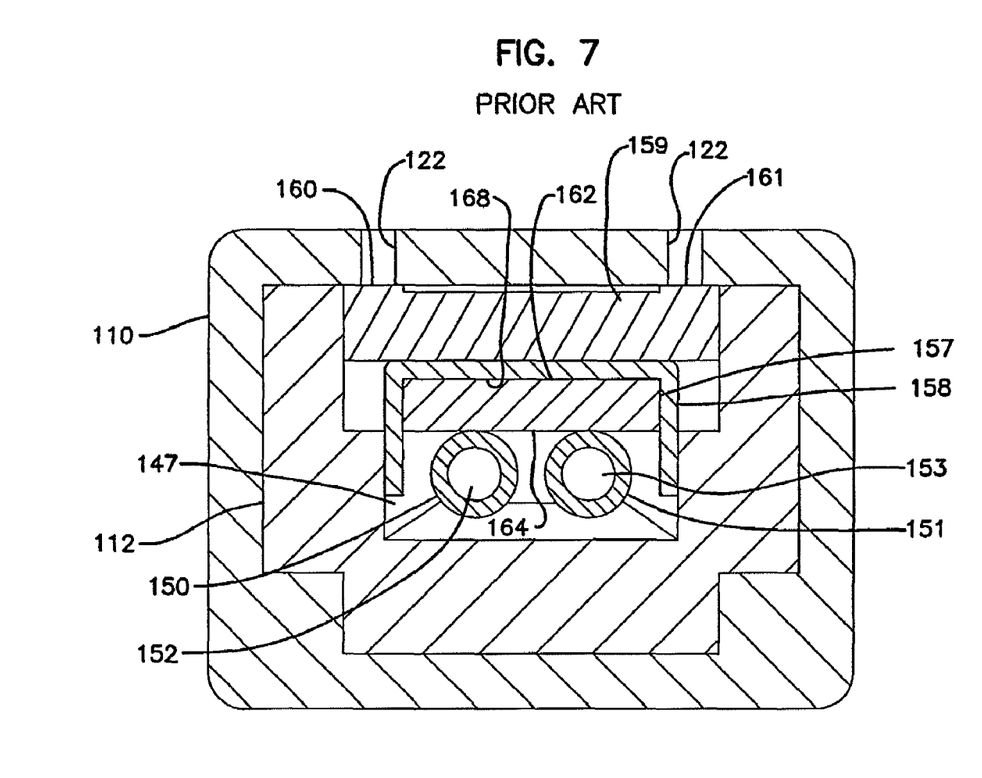
FIG. 7 is a cross-sectional view similar to FIG. 4 of a prior art plug assembly.

Referring now to FIG. 7, a prior art glue pellet 157 is illustrated. The prior art glue pellet 157 includes a first surface 162, which is in thermally conductive contact with a bottom surface 168 of a saddle 158, and a second surface 164 that is oppositely disposed from the first surface 162. The second surface 168 of the prior art glue pellet 157 is a planar surface and, therefore, does not contain any channels. When the prior art glue pellet 157 is assembled in a compartment 147 of a housing part 112, the planar second surface 164 is disposed tangentially atop outer sleeves 150, 151. In operation, an electrical power source (not shown) is connected to resistor pads 160, 161 through apertures 122, which are defined by an outer body member 110. Electrical current is passed through the resistor 159, which heats up the prior art glue pellet 157 by way of the thermally conducting saddle 158. The heat of the resistor 159 causes the prior art glue pellet 157 to melt. As the prior art glue pellet 157 melts, the melted prior art glue pellet 157 flows around the outer sleeves 150, 151 and optical fibers 152, 153. When the electrical current is no longer applied to the resistor pads 160, 161 of the resistor 159, the melted prior art glue pellet 157 solidifies, thereby securing the sleeves 150, 151 and fibers 152, 153 in their correct position.

The subject embodiment of the glue pellet 57 provides some advantages over the prior art glue pellet 157. Referring again to FIG. 4, these advantages will now be described. In operation, an electrical power source (not shown) is connected to the pads 60, 61 of the resistor 59 through the apertures 22 in the outer body member 10. As electrical current is passed through the resistor 59, heat, which is generated by the flow of current through the resistor 59, is transferred to the glue pellet 57 through the saddle 58. As nearly half of the outer circumference of the outer surface of each outer sleeve 50, 51 is disposed in one of the channels 66a, 66b, the glue pellet 57 does not need to completely melt to secure the outer sleeves 50, 51 and optical fibers 52, 53 in their correct position. All that is needed to secure the outer sleeves 50, 51 and optical fibers 52, 53 is for the glue pellet 57 to soften so that it becomes tacky. For example, in the subject embodiment of the present invention, the outer sleeves 50, 51 and optical fibers 52, 53 are secured with the glue pellet 57 softening by 10%. As a result, the amount of time during which heat is applied to secure the sleeves 50, 51 and fibers 52, 53 in the plug assembly 2 is significantly reduced.

In addition to this advantage, another advantage of the glue pellet 57 of the subject embodiment is that the temperature range over which the glue pellet 57 can be used is increased. As previously stated, heat must be applied to the prior art glue pellet 157 for a longer duration to completely melt the prior art glue pellet 157 than must be applied to the glue pellet 57 of the subject embodiment to soften the glue pellet 57. However, when heat is applied to the resistor 159 for long periods of time, the field technician must be careful not to overheat and permanently damage the resistor 159. Overheating the resistor 159 becomes especially problematic when the atmospheric temperature is low, such as in the wintertime. When the atmospheric temperature is low, the temperature differential between the steady state temperature of the prior art glue pellet 157 and the melting point temperature of the prior art glue pellet 157 is greater than when the atmospheric temperature is high. As a result, the time required to heat the prior art glue pellet 157 to its melting point and to maintain that temperature until the prior art glue pellet 157 is completely melted is longer than when the atmospheric temperature is higher. The glue pellet 57 of the subject embodiment, however, does not require such a long duration of heating since the glue pellet 57 does not need to completely melt. Therefore, heat can be applied to the glue pellet 57 of the subject embodiment at lower temperatures without potentially damaging the resistor 59. As a result, the temperature range over which the glue pellet 57 can be heated is larger than the prior art glue pellet 157. By way of example only, the temperature range of the subject embodiment is −40° C. to 75° C.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An optical fiber terminating assembly comprising:
a housing which can receive an optical fiber to be terminated so that it is located in alignment with a length of another optical fiber, or an optoelectronic device, the housing including a compartment through which the optical fiber to be terminated can extend;
a heat responsive adhesive element disposed in the compartment having at least one pathway preformed into the heat responsive adhesive element that is adapted to receive a portion of the optical fiber;
a thermally conductive element disposed in the compartment, wherein the thermally conductive element is coupleable to a source of energy; and
wherein the heat responsive adhesive element is adapted to soften in response to heat from the thermally conductive element such that the heat responsive adhesive element becomes tacky while being in a non-flowable softened state and to adhere to the optical fiber in the pathway while in the softened state to secure the optical fiber in position.

2. An optical fiber terminating assembly as claimed in claim 1, wherein the pathway is a channel disposed in a surface of the heat responsive adhesive element.

3. An optical fiber terminating assembly as claimed in claim 2, wherein the channel in the surface of the heat responsive adhesive element has an arcuate shape.

4. An optical fiber terminating assembly as claimed in claim 1, wherein the compartment accommodates the heat responsive adhesive element, the thermally conductive element, and an electrically conductive element, the electrically conductive element being mounted such that when an electrical current is passed through the electrically conductive element the heat in the thermally conductive element softens the heat responsive adhesive element.

5. An optical fiber terminating assembly as claimed in claim 4, wherein the electrically conductive element is a resistor.

6. An optical fiber terminating assembly as claimed in claim 1, wherein the compartment accommodates the heat responsive adhesive element and the thermally conductive element, the compartment having access for a heat source to be coupled with the thermally conductive element.

7. An optical fiber terminating assembly as claimed in claim 1, wherein the thermally conductive element is a saddle which straddles the heat responsive adhesive element.

8. An optical fiber terminating assembly as claimed in claim 1, wherein the housing is formed to terminate more than one optical fiber.

9. An optical fiber terminating assembly as claimed in claim 1, wherein the optical fiber includes a sleeve, the compartment is configured to receive a portion of the sleeve, so that the heat in the thermally conductive element causes the heat responsive adhesive element to soften and adhere to the sleeve to secure it in position.

10. An optical fiber terminating assembly comprising an outer body member;
a first member locatable within the outer body member, with the first member carrying a length of optical fiber which protrudes therefrom;
a housing locatably in alignment with the first member, with the housing having an access opening for receiving an optical fiber to be terminated so that the optical fiber can be aligned and abutted with the length of optical fiber and a compartment, through which the optical fiber to be terminated extends, wherein the compartment receives:

a thermally conductive element, which can be coupled to a source of energy; and a heat responsive adhesive element in thermally conductive contact with the thermally conductive element, the heat responsive adhesive element defines at least one pathway and is adapted to soften without melting and to adhere to the optical fiber while in the softened state to secure the optical fiber in position in response to energy applied to the thermally conductive element.

11. An optical fiber terminating assembly as claimed in claim 10, wherein the pathway is a channel disposed in a surface of the heat responsive adhesive element.

12. An optical fiber terminating assembly as claimed in claim 11, wherein the two channels in the surface of the heat responsive adhesive element have an arcuate shape.

13. An optical fiber terminating assembly as claimed in claim 10, wherein the compartment accommodates the heat responsive adhesive element, the thermally conductive element, and an electrically conductive element, the electrically conductive element being mounted such that when an electrical current is passed through the electrically conductive element the heat in the thermally conductive element softens the heat responsive adhesive element.

14. An optical fiber terminating assembly as claimed in claim 13, wherein the electrically conductive element is a resistor.

15. An optical fiber terminating assembly as claimed in claim 10, wherein the compartment accommodates the heat responsive adhesive element and the thermally conductive element, the compartment having access for a heat source to be coupled with the thermally conductive element.

16. An optical fiber terminating assembly as claimed in claim 10, wherein the thermally conductive element is a saddle which straddles the heat responsive adhesive element.

17. An optical fiber terminating assembly as claimed in claim 10, wherein the housing is formed to terminate more than one optical fiber.

18. A method for terminating at least one optical fiber, the method comprising:

providing an optical fiber terminating assembly having:
an outer body member;
a first member locatable within the outer body member, with the first member carrying a length of a first optical fiber which protrudes therefrom;
a housing in alignment with the first member, the housing including a compartment;
a glue pellet disposed in the compartment having at least one pathway preformed into the glue pellet;
a thermally conductive element disposed in the compartment in thermally conductive contact with the glue pellet, wherein the thermally conductive element is coupleable to a source of energy;

inserting a second optical fiber to be terminated into the compartment such that a portion of the second optical fiber is disposed in the pathway;

applying energy to the thermally conductive element; and stopping the application of energy to the thermally conductive element when the glue pellet softens such that the glue pellet is tacky while being in a non-flowable state.

19. A method for terminating at least one optical fiber as claimed in claim 18, wherein the application of energy to the thermally conductive element is stopped when the glue pellet softens by 10%.

20. A method for terminating at least one optical fiber as claimed in claim 18, wherein the energy applied to the thermally conductive element is electrical current.

* * * * *